US000001823H

United States Statutory Invention Registration [19]

[11] Reg. Number: H1,823

Wolford

[45] Published: Dec. 7, 1999

[54] BUS BAR SCREW JACK

[75] Inventor: Larry L. Wolford, Long Beach, Calif.

[73] Assignee: Atlantic Richfield Company, Los Angeles, Calif.

[21] Appl. No.: 08/544,055

[22] Filed: Oct. 17, 1995

[51] Int. Cl.[6] ..... B66F 3/08

[52] U.S. Cl. ..... 254/98; 254/100; 254/133

[58] Field of Search ..... 254/98, 100, 131, 254/424, 133, 101, DIG. 1

[56] References Cited

U.S. PATENT DOCUMENTS

| | | | |
|---|---|---|---|
| 252,401 | 1/1882 | Stauffer | 254/98 |
| 587,463 | 8/1897 | Sullivan | 254/98 |
| 1,061,658 | 5/1913 | Bradshaw | 254/100 |
| 1,264,417 | 4/1918 | Matson | 254/100 |
| 2,093,284 | 9/1937 | Mandl | 254/100 |
| 2,984,417 | 5/1961 | Voorhees | 254/100 |
| 3,104,493 | 9/1963 | Nalle | 254/98 |
| 3,398,933 | 8/1968 | Haroldson | 254/98 |
| 3,603,552 | 9/1971 | Wheelock | 254/98 |
| 4,817,977 | 4/1989 | Bookbinder | 254/98 |
| 5,129,601 | 7/1992 | Henkel | 254/98 |
| 5,297,779 | 3/1994 | Collins, Jr. et al. | 254/98 |
| 5,674,045 | 10/1997 | Eckloff et al. | 254/100 |

*Primary Examiner*—Harold J. Tudor
*Attorney, Agent, or Firm*—Sheldon & Mak

[57] ABSTRACT

A bus bar screw jack is useful in the removal, inspection, and reinstallation of bus bars. The end of the screw jack which engages the bus bar comprises a channel with a foam rubber coating to nonslidably receive the bus bar. The foam rubber coating also prevents damage to the insulating coating on the bus bar during installation. The screw jack comprises an externally threaded member, an internally threaded member threaded onto the externally threaded member, a support member on one end of the externally threaded member, and a washer interposed between the support member and internally threaded member.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BUS BAR SCREW JACK

BACKGROUND OF THE INVENTION

This invention relates to screw jacks and a method of using the screw jacks.

Large conductors called bus bars are used in the production of electricity. A typical bus bar is fabricated from a copper alloy, has dimensions of ⅝"×6"×39", and weighs approximately 100 pounds. It is frequently necessary to remove the bus bars from their position in electrical equipment for routine maintenance and inspection. Because the bus bars are heavy and bulky, the reinstallation of overhead bus bars requires considerable effort to hold the bus bar in position and secure the bus bar in place. Because the rooms in which the bus bars are located are typically small, the task of installing the bus bars is made even more difficult.

To complicate the handling of the bus bar even further, the bus bar may often be coated with a thin layer of high voltage insulation. It is critical that the insulation is not damaged during removal, inspection, and reinstallation of the bus bar. If the insulation is damaged, the bus bar must be reinsulated resulting in additional downtime of the electricity-producing unit.

BRIEF SUMMARY OF THE INVENTION

In accordance with the present invention there is provided a bus bar screw jack for use in the installation of bus bars, having an externally threaded member and an internally threaded member threaded thereon. A tubular support is placed over one end of the external threaded member and rests against the internally threaded member. One end of the tubular support has a channel with a smooth surface formed therein. A bus bar, which is being installed in a conductive position, is held inside the channel and is supported during installation of the bus bar.

In a preferred embodiment, the bus bar screw jack is provided with a handle on the internally threaded member to facilitate rotating the internally threaded member on the externally threaded member, and a washer is interposed between the internally threaded member and the tubular support. The channel is advantageously coated with a compressible rubber which prevents the bus bar from sliding relative to the bus bar screw jack. During installation, the rubber also helps prevent damage to the bus bar as well as the bus bar insulation.

In another embodiment of the invention, there is provided a method of installing a bus bar with a bus bar screw jack comprising supporting the bus bar on the screw jack, stabilizing the bus bar on the screw jack, positioning the bus bar in its conductive position; and fastening the bus bar in the conductive position.

In a preferred embodiment, the bus bar is positioned by adjusting the elevation of the bus bar with the screw jack. The screw jack is operated by rotating the internally threaded member on the externally threaded member whereby the supporting tubular member is moved up or down as required to properly position the bus bar. The rotational orientation of the bus bar may also be adjusted with the screw jack.

These and other features and advantages of the present invention will appear from the following Detailed Description and the accompanying drawings in which similar reference characters denote similar elements throughout the several views.

DETAILED DESCRIPTION

Figure 1:
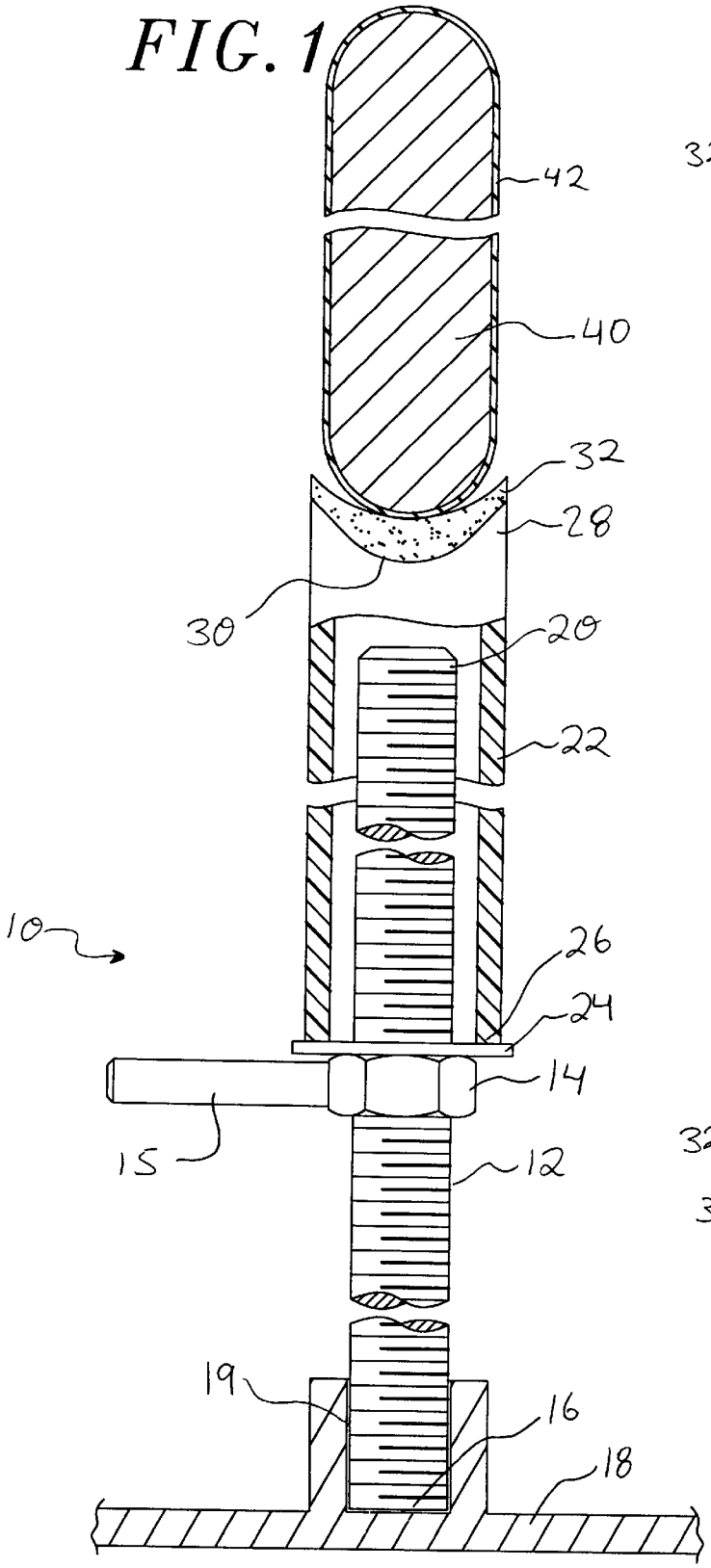
FIG. 1 is a view in partial cross section of a bus bar screw jack.
Figure 2:
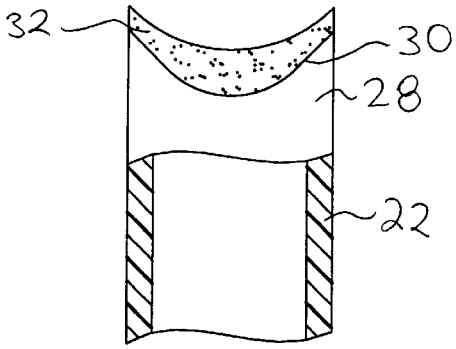
FIG. 2 is fragmentary view in partial cross section of a bus bar receiving end of the bus bar screw jack of FIG. 1.
Figure 3:
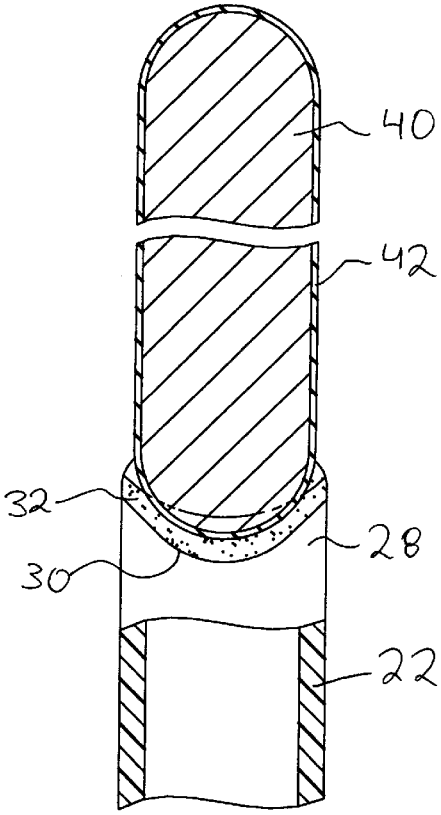
FIG. 3 is a fragmentary view in partial cross section of the bus bar screw jack of FIG. 1 supporting a bus bar.

FIG. 1 shows a bus bar screw jack, generally designated 10, which may comprise an externally threaded member 12 preferably made from a piece of allthread which is approximately six (6) feet long and approximately ¾" in diameter. Allthread is a term commonly used to describe a rod having threads over its entire length. An internally threaded member 14 or nut is threaded onto the allthread 12. In a preferred embodiment, a handle 15 is attached to the nut to facilitate rotating the nut on the allthread.

The lower end 16 of the allthread provides a foundation on which the screw jack rests. Additionally, the foundation end 16 of the screw jack can be inserted into a pedestal 18 which rotatably receives the foundation end 16 of the allthread 12 in unthreaded opening 19. The upper end 20 of the allthread receives a tubular support 22 which is preferably made from a 1½" diameter PVC pipe approximately four (4) feet in length. The upper side of the internally threaded member which faces the support-receiving end of the allthread comprises the support side of the nut on which the PVC pipe can rest. The lengths of the allthread and PVC pipe can be varied for different applications.

In the fully assembled state, a washer 24 rests on the nut 14 and a bushing end 26 of the PVC pipe rests on the washer. The washer provides a platform to support the large diameter tubular support member and facilitates the operation of the screw jack as described below. The PVC material provides a good bushing surface between the washer and the PVC pipe. Thus, the PVC pipe is free to smoothly rotate relative to the nut and washer.

The PVC pipe has a bus bar receiving end 28 having a channel 30. Because the channel has a smooth surface and is shaped to the shape of a bus bar 40, the bus bar insulation is not damaged by the PVC pipe, and the bus bar is stably supported by the PVC. It is preferred to attach a piece of rubber or foam rubber 32 in the channel 30, such as with an adhesive. When the screw jack supports the bus bar, the foam rubber, which can comprise an increased thickness in the central portion, is compressed and grips the bus bar, preventing it from sliding relative to the PVC pipe. The foam rubber also protects the insulation from being scratched, cut, or otherwise damaged. Further, the channel size can be varied for different applications.

Illustrative conductive bus bar 40 with which the invention may be used is approximately ⅝"×6"×39" and weighs as much as 100 pounds. The bus bar is coated with a thin covering of high voltage insulation 42 which insulates the bus bar.

During installation of the bus bar, the screw jack is used to support the bus bar while the bus bar is stabilized on the screw jack. Thereafter, fine adjustment is made with the screw jack to position the bus bar into its conductive position, and it is fastened into place with bolts.

To illustrate this practice, the screw jack is positioned close to the center of the bus bar to support substantially all of the weight of the bus bar. With the screw jack supporting almost all of the weight of the bus bar, the bus bar can be stabilized on the screw jack. Thereafter, the bus bar is aligned and fastened into the conductive position. To complete this task, the bus bar may be raised or lowered as necessary, by rotating the nut on the allthread thereby threading the nut up or down along the allthread and adjusting the elevation of the bus bar. With a washer interposed between the nut and the PVC pipe, the rotation of the nut does not tend to rotate the PVC pipe and bus bar. Therefore, the bus bar is raised and lowered without disturbing the rotational orientation of the bus bar.

When the handle 15 is attached to the nut and the screw jack is being used in cramped space, the handle may become obstructed by a wall or other obstacle so that the nut is unable to be rotated. In such a case, a clamp can be clamped onto the allthread and rotate the allthread in the unthreaded opening 19 to move the nut up and down the allthread. In the alternative, a hole can be drilled in the allthread in which a rod can be inserted to rotate the allthread to function as a variable length handle.

The rotational orientation of the bus bar can also be adjusted as necessary, by rotating the PVC pipe on the washer. Again, with the washer interposed between the nut and the PVC pipe, the rotation of the PVC pipe is not imparted to the nut, and thus, the rotational orientation of the bus bar can be adjusted without disturbing the elevation of the bus bar. After the first end of the bus bar is bolted into place, the screw jack is moved to the unbolted end of the bus bar and the nut is threaded up or down the allthread to properly position the bus bar, so that it can be fastened in the conductive position at the other end.

As can be seen, a bus bar screw jack is disclosed which utilizes a tubular member having a channel at one end with a coating in the channel to more efficiently hold a bus bar without damaging the bus bar insulation, thereby enabling the bus bar to be installed without damage. While embodiments and applications of this invention have been shown and described, it is apparent to those skilled in the art that many more modifications are possible without departing from the inventive concepts herein. It is, therefore, to be understood that the scope of the invention should be limited only by the appended claims, wherein what is claimed is:

What is claimed is:

1. A bus bar screw jack for supporting an insulated bus bar during removal and installation, the jack comprising:

an externally threaded member having a support receiving end and a foundation end;

a one piece internally threaded member threaded onto the externally threaded member and having a support side facing the support receiving end of the externally threaded member; and a tubular support member disposed over the support receiving end, the tubular support member having a bushing end resting on the support side of the internally threaded member, and a bus bar receiving end having a channel with a smooth surface conformed to the shape of the bus bar to receive and support the bus bar on the smooth surface without damage to the bus bar during installation.

2. A jack according to claim 1 further comprising a washer disposed over the support receiving end and interposed between the support side of the internally threaded member and the tubular support member.

3. A jack according to claim 1 further comprising a handle attached to the internally threaded member to facilitate rotating the internally threaded member on the externally threaded member.

4. A jack according to claim 1, further comprising a pedestal which rotatably receives the foundation end of the externally threaded member in an unthreaded opening to stabilize the jack.

5. A jack according to claim 1 further comprising a coating on the channel of the bus bar receiving end.

6. A jack according to claim 5 wherein the coating is a compressible rubber to nonslidably receive the bus bar to prevent the bus bar from sliding within the channel.

7. A jack according to claim 1 wherein the externally threaded member comprises allthread and the internally threaded member comprises a nut.

8. A bus bar screw jack to support an insulated bus bar during removal and installation, the jack comprising:

an externally threaded member having a support receiving end and a foundation end;

a one piece internally threaded member threaded onto the externally threaded member;

a washer disposed on the support receiving end;

a tubular support disposed over the support receiving end, the tubular support having a bushing end resting on the washer, and a bus bar receiving end comprising a channel with a smooth surface conformed to the shape of the bus bar to receive and support the bus bar on the smooth surface, and a compressible rubber coating on the channel of the bus bar receiving end of the tubular support to nonslidably hold the bus bar so that the bus bar insulation is not damaged.

* * * * *